(No Model.) 3 Sheets—Sheet 1.

H. E. HAWK.
GRAIN METER.

No. 461,335. Patented Oct. 13, 1891.

Witnesses:
Jas. K. M⁀Cathran
W. S. Duvall

Inventor
Hale E. Hawk
By his Attorneys,
C. A. Snow & Co.

(No Model.) 3 Sheets—Sheet 2.

H. E. HAWK.
GRAIN METER.

No. 461,335. Patented Oct. 13, 1891.

Witnesses:
Jas. K. McCathran
W. S. Duvall

Inventor
Hale E. Hawk.
By his Attorneys,
C. A. Snow & Co.

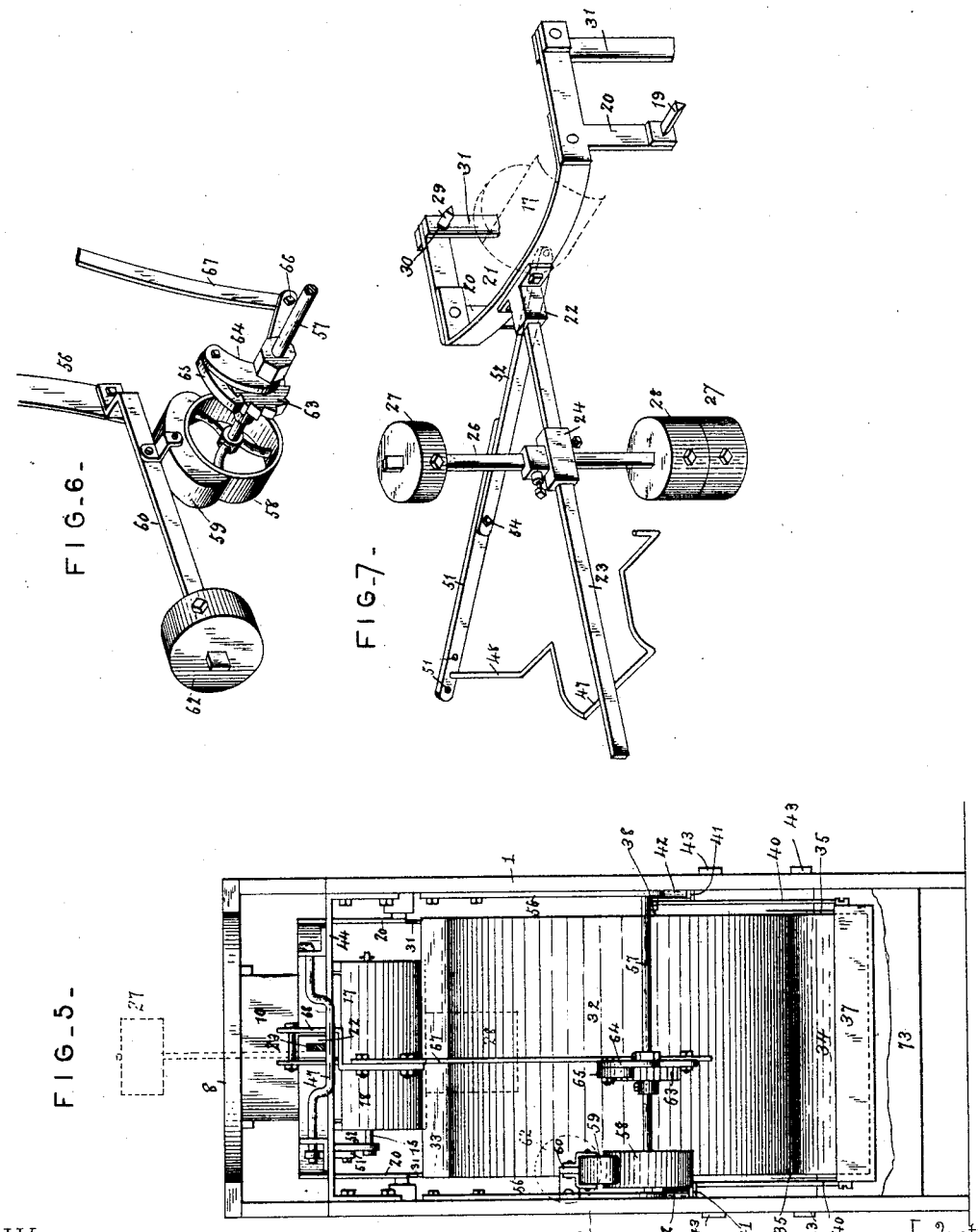

UNITED STATES PATENT OFFICE.

HALE E. HAWK, OF BUCYRUS, OHIO.

GRAIN-METER.

SPECIFICATION forming part of Letters Patent No. 461,335, dated October 13, 1891.

Application filed May 9, 1890. Serial No. 351,177. (No model.)

*To all whom it may concern:*

Be it known that I, HALE E. HAWK, a citizen of the United States, residing at Bucyrus, in the county of Crawford and State of Ohio, have invented a new and useful Automatic Grain Scale or Meter, of which the following is a specification.

This invention has relation to automatic grain scales or meters; and the objects of the invention are to provide a meter or scale for the above purpose that will automatically and accurately weigh the grain, cut off, and deliver the same; to provide means for braking the return of the parts after the weighing of grain, for balancing the cut-off so as to close the same proportionate to the elevation of the scale-beam, and to provide a means for operating the brake mechanism through the medium of the scale-beam, and said means to be so arranged as to not influence said scale-beam in its balancing; furthermore, to provide a counterbalancing-weight for the pivoted delivery-pan, whereby the same is automatically closed after the delivery of grain, and means for removing the influence of the weight from the pan during the entire delivery of said pan.

Other objects and advantages of the invention will hereinafter appear, and the novel features thereof will be particularly pointed out in the claims.

Figure 1:
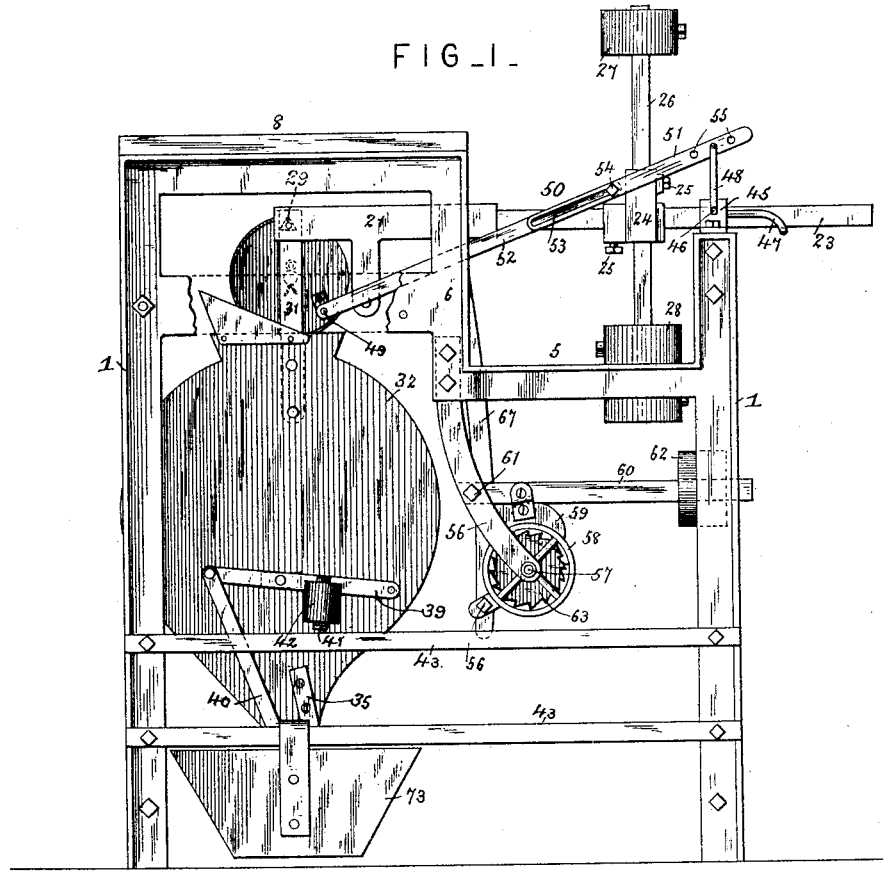
Figure 2:
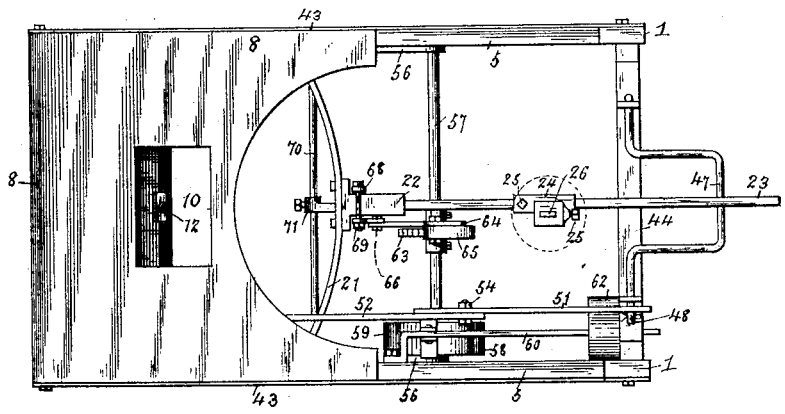
Figure 4:
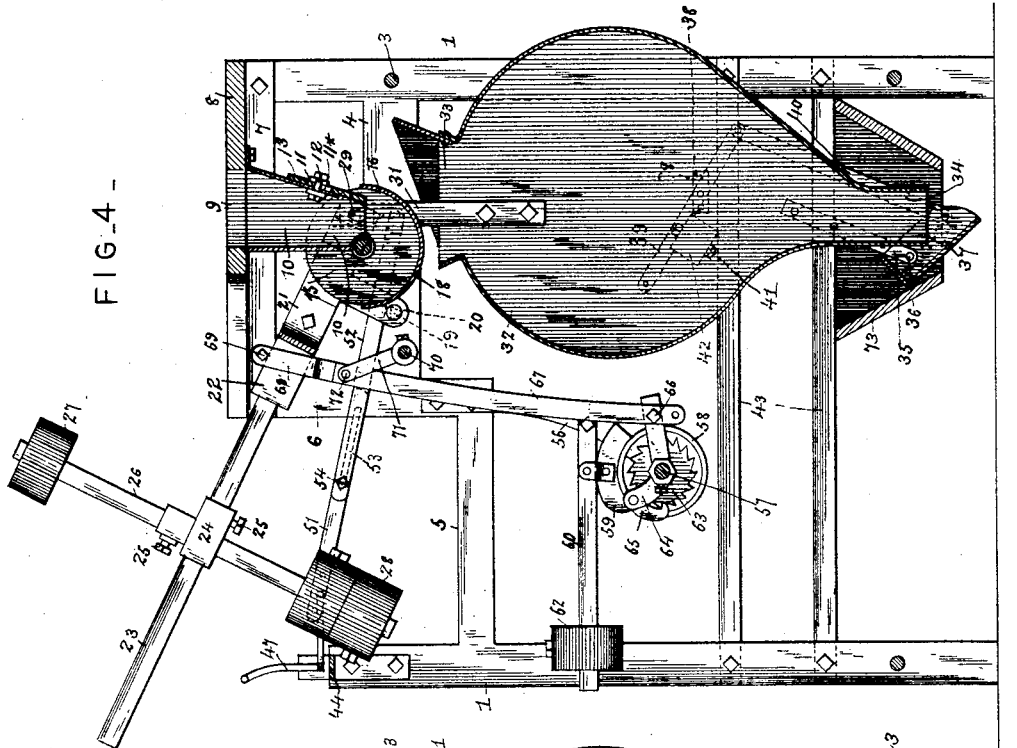
Figure 3:
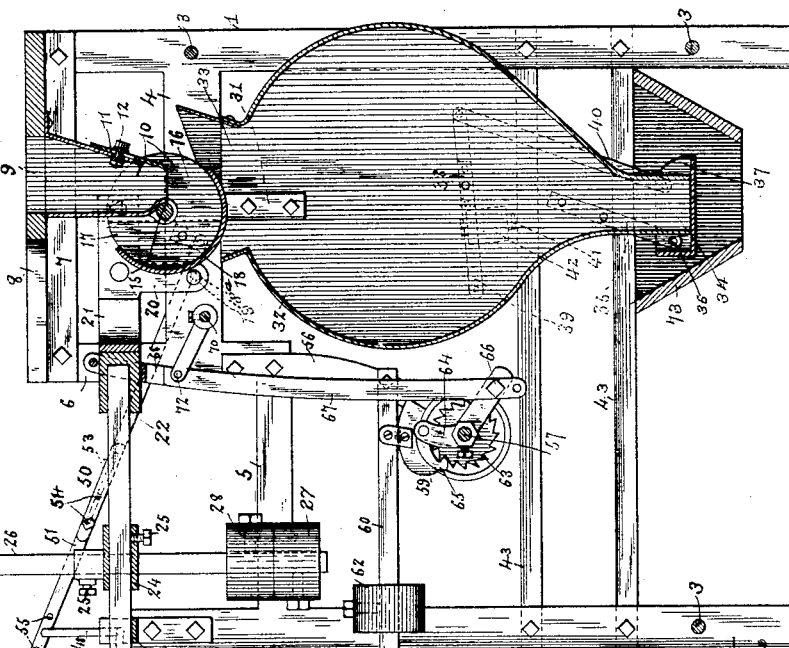

Referring to the drawings, Figure 1 is a side elevation of a grain scale or meter constructed in accordance with my invention, the parts being in position as assumed by them in the act of receiving grain from the spout. Fig. 2 is a plan view of the same. Fig. 3 is a vertical longitudinal central section of the apparatus, the parts being in the same position as shown in Fig. 1. Fig. 4 is a view similar to Fig. 3, the parts being in position as assumed by them in the act of delivering grain after the same has been weighed. Fig. 5 is a front elevation. Fig. 6 is a detail in perspective of the brake-shaft, the wheel, the shoe and its governing-weight, and the pawl and ratchet for operating said shaft. Fig. 7 is a perspective of the cut-off counterbalancing crank-shaft, the connecting-bar, and the scale-beam.

Like numerals of reference indicate like parts in all the figures of the drawings.

In practicing my invention I construct a suitable frame, which in this instance comprises four upright posts 1, connected by suitable tie-bars 3 at convenient points. The opposite front and rear bars are connected by side bars 4, which have their forward halves slightly dropped, as at 5. From the front ends of the side bars 4 project short vertical side bars 6, which are connected to the rear posts 1 by means of upper cross-bars 7. The upper cross-bars 7 support a platform 8, having an opening 9, which communicates with a grain-chute and from which depends the delivery-spout 10. The delivery-spout 10 is reduced toward its lower end, and its rear wall, which is inclined as shown, is provided with a perforation 11, through which passes a set-bolt 12, said bolt serving to adjust a feed-plate or slide 13, mounted on the bolt and slotted, as at 11*, for that purpose. By means of the set-bolt 12 the plate may be raised and lowered into and out of a plane with the opposite edge of the spout. A shaft 15 is mounted in the lower end of the spout adjacent to the front wall thereof, and upon said shaft is mounted an oscillating grain cut-off 16. The cut-off 16 comprises opposite circular heads or sides 17, which are connected by a semicircular bottom 18. In the side bars 4 are formed bearing-openings 18ª, in which are journaled opposite knife-edged bearings 19, projecting laterally from the lower end of depending arms 20, the upper ends of the arms being rigidly connected to or formed integral with a U-shaped bail 21, which bail embraces the cut-off, or rather extends at each side thereof. The front end of the bail is provided with a socket 22, and in the same is secured the rear end of the scale-beam 23. A two-way sleeve 24 is mounted upon the beam 23, each of said sleeves being provided with set-bolts 25, and through the vertical sleeves is inserted a counterbalancing-beam 26, provided at its upper and lower ends with counterbalancing-poise 27. The weights are adjustable upon the beam and the beam is adjustable in its sleeve, so that the upper weight 27, which is a counterpoise, may be thrown to a position slightly in rear of the bearing 19 when the scale-beam 23 is elevated, as in the act of delivering subsequent to weighing. The rear terminals of the bail 21 are provided with knife-bearing lugs 29, projecting inwardly therefrom, and taking over the same are bearing-openings 30, formed in the upper ends of a pair of suspension-straps 31, the lower ends of which are secured to the sides of the hopper 32. The hopper 32 is provided at its upper end with an opening 33, with opposite substantially semicircular sides, which toward their lower ends converge to form a delivery neck or spout 34.

From the above it will be apparent that the hopper is loosely suspended and has no frictional contact with any of the parts of the apparatus.

A pair of short straps 35 depend from the opposite sides of the hopper 32 at an inclination and terminate slightly in advance of the front wall of the hopper 32. In the lower ends of these straps there is pivoted, as at 36, the opposite side walls of a delivery-pan 37. Bearing-studs 38 project from the opposite sides of the hopper 32, and upon said studs are mounted counterbalancing-levers 39, the rear ends of which are by links 40 loosely connected to the rear or delivery end of the delivery-pan 37. An L-shaped bracket 41 is secured to the front end of the lever 39, and secured to the same is a counterbalancing-weight 42, said weight being designed to maintain the delivery-pan 37 in a raised or closed position under the delivery-spout 34 of the hopper 32. Immediately under the counterbalancing-weight 42 the opposite vertical posts 1 are connected by cross-bars 43, said bars being in such position with relation to the weight and the pan as to receive and act as a support for the weight when the hopper is lowered and the pan in the act of delivering, so that during the entire period of delivery or when the pan is in such position the weight does not exert any influence to raise the pan either partially or wholly until the very last grain has been removed from the pan, and the hopper is being returned to its original or filling position.

The two front posts 1 are connected by a transverse bar 44, and upon said bar near its opposite ends are bearing-ears 45, in which is journaled loosely a shaft 46. The shaft 46 between its bearings is provided with a central crank portion 47, and at one side of one of its bearings is provided with a crank-arm 48, said crank-arm being disposed at a right angle to the crank portion 47.

From the side of the cut-off 16 corresponding to the crank-arm 48 said side is provided with a bearing-stud 49, and said crank-arm and bearing-stud are connected by means of a connecting-bar 50. The connecting-bar 50 is preferably formed of two sliding sections, one of which is slotted near its inner end and the other of which is provided with the guide-lug.

51 and 52 represent the front and rear sections, as mentioned, and 53 and 54 the slot and stud, respectively. The front end of the front section 51 is provided with a series of adjusting-holes 55, whereby the crank-arm 48 may be inserted in any one of the same. The object and purpose of this crank-shaft and its connection with the cut-off are that simultaneous with the lowering of the hopper will be oscillated or moved said cut-off—that is to say, at the time that an amount of grain has been deposited in the hopper sufficient to begin raising or counterbalancing the scale-beam and its weight said cut-off will begin to close, and the closing thereof will be exactly proportionate to the lowering of the hopper, so that by the time the hopper has received an exact quantity sufficient to counterbalance the weight the cut-off will be exactly in a position to wholly shut off the feed of grain; or when the hopper is nearly in the position of counterbalancing the cut-off will be raised to such a position that only a few grains can pass over the edge of the bottom thereof. After delivery it will be apparent that the hopper will be raised, and proportionate to its rising will be the movement of the cut-off, whereby the latter will open. This opening movement of the cut-off is secured in the same proportion as the raising of the hopper by means of the scale-beam depressing the crank portion 47, and thus moving the crank-arm.

Depending from the short vertical standards or bars 6 is a pair of oppositely-curved supporting-arms 56, in the lower extremities of which is journaled a brake-shaft 57. Upon the brake-shaft 57 is mounted a brake-wheel 58, upon which is mounted loosely a brake-shoe 59, connected to a brake-arm 60, pivoted to one of the adjacent arms 56, as at 61, and upon the arm 60 is mounted a weight 62.

At one side of the brake-wheel 58 there is mounted a ratchet-wheel 63, and at one side of the ratchet-wheel is a bell-crank lever 64, to one of the terminals of which there is loosely pivoted a gravity-pawl 65, adapted to engage the teeth of the ratchet-wheel 63. Pivoted, as at 66, to the opposite terminal of the bell-crank is a connecting bar or rod 67, the upper end of which terminates in a yoke 68, connected by a bolt 69, said yoke loosely embracing the socket 22 of the scale-bail 21, so that any movements of the bail in the act of rising will after reaching a certain elevation act upon the bolt 69 and rod 67, and serve to raise said rod and with it the adjacent end of the bell-crank 64, which causes an opposite movement or lowering of the opposite terminal of said crank and with it the pawl 65, which engages the teeth of the ratchet. A subsequent lowering of the bail after the delivery of the grain and the parts are being returned to their normal position causes a contrary movement of the parts just described, so that the pawl 65, engaging the ratchet, serves to partially rotate the ratchet, the brake-shaft, and the brake-wheel, and a resistance to the free rotation of the shaft and the return of the parts is caused by the